United States Patent [19]
Folwell et al.

[11] Patent Number: 5,369,666
[45] Date of Patent: * Nov. 29, 1994

[54] MODEM WITH DIGITAL ISOLATION

[75] Inventors: Dale E. Folwell, Placentia; Raphael Rahamim, Orange, both of Calif.

[73] Assignee: Rockwell International Corporation, Seal Beach, Calif.

[*] Notice: The portion of the term of this patent subsequent to May 24, 2011 has been disclaimed.

[21] Appl. No.: 895,968

[22] Filed: Jun. 9, 1992

[51] Int. Cl.⁵ .................. H04B 1/38; H02H 3/00; H02H 3/22; H02H 9/04
[52] U.S. Cl. ........................... 375/8; 379/98; 379/399; 379/412; 361/56; 361/111
[58] Field of Search ............ 379/95, 98, 412, 410; 375/8, 34; 370/85.1, 94.1, 56; 361/413; 378/110

[56] References Cited
U.S. PATENT DOCUMENTS

| | | |
|---|---|---|
| 4,203,006 | 5/1980 | Mascia . |
| 4,253,048 | 2/1981 | Osako ........................ 378/110 |
| 4,395,590 | 7/1983 | Pierce et al. .................. 375/8 |
| 4,417,099 | 11/1983 | Pierce ........................ 379/412 |
| 4,578,533 | 3/1986 | Pierce ........................ 379/98 |
| 4,620,294 | 10/1986 | Leung et al. ................. 379/98 |
| 4,896,349 | 1/1990 | Kubo et al. .................. 379/90 |
| 5,086,454 | 2/1992 | Hirzel ........................ 379/98 |
| 5,224,154 | 6/1993 | Aldridge et al. ............... 375/8 |

OTHER PUBLICATIONS
"Radio Shack New 1974–75 Dictionary of Electronics" Rudolf F. Graf p. 687.

*Primary Examiner*—James L. Dwyer
*Assistant Examiner*—Scott L. Weaver
*Attorney, Agent, or Firm*—H. Frederick Hamann; George A. Montanye; Tom Streeter

[57] ABSTRACT

The MODEM WITH DIGITAL ISOLATION removes the relatively large heavy isolation transformer from the Data Access Arrangement and substitutes two tiny pulse transformers between the Integrated Analog and Digital Signal Processor with multiplexers and demultiplexers to eliminate analog distortion and multiple leads, and to accommodate Lap Top/Palm Top computers, while enhancing data speeds. The combination with surge protection enables both uncommon and common mode protection.

23 Claims, 6 Drawing Sheets

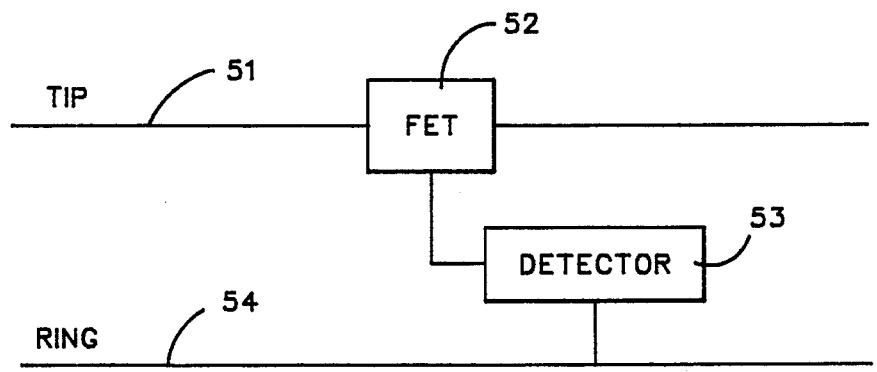
FIG. 3
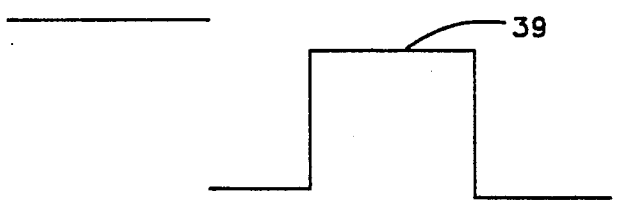
FIG. 4
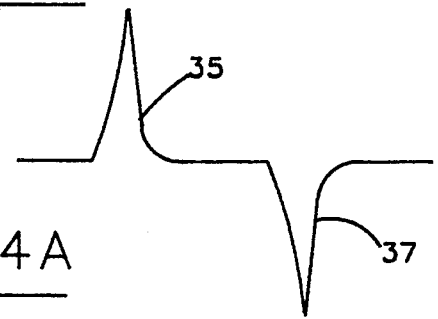
FIG. 4A
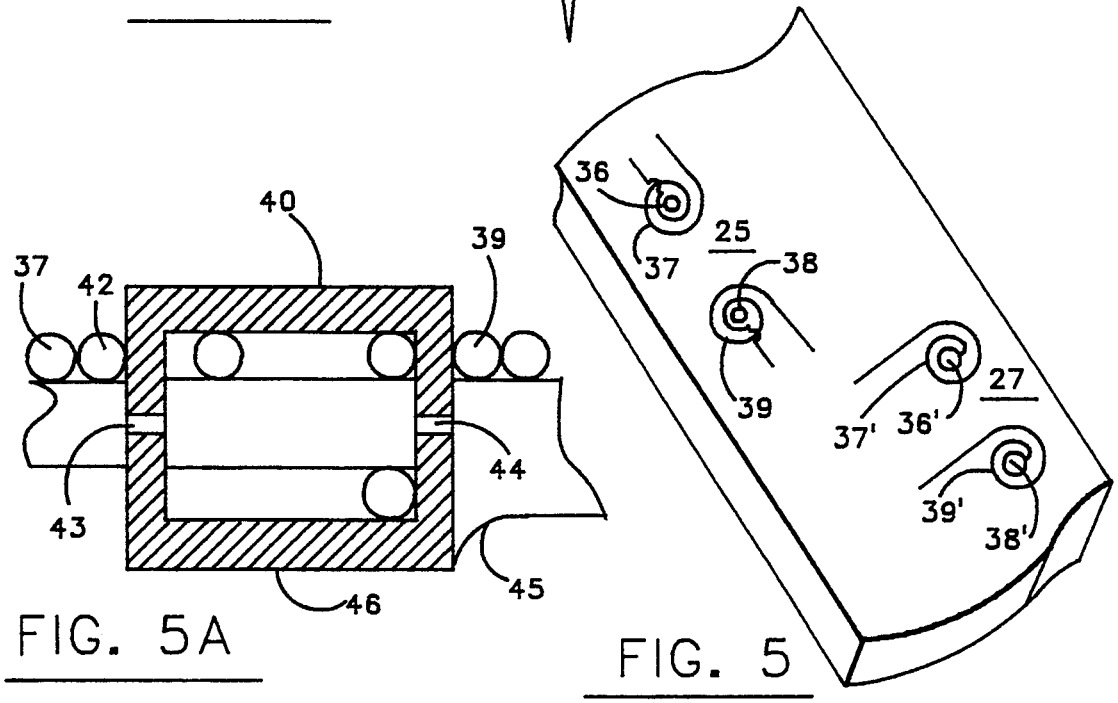
FIG. 5A
FIG. 5

MODEM WITH DIGITAL ISOLATION

BACKGROUND OF THE INVENTION

This application is related to simultaneously filed U.S. application Ser. No. 07/895,969, filed Jun. 9, 1992 and now U.S. Pat. No. 5,315,651, entitled ACTIVE SURGE REJECTION CIRCUIT by the same inventors, assigned to a common assignee.

Field of the Invention

The invention relates to modems and, more particularly, eliminates the relatively large isolation transformer from the modem while changing isolation from the analog signal region to the digital signal region to avoid analog distortion, and obviate the isolation transformer.

Prior Art

One problem of the prior art is the fact that the Data Access Arrangement (DAA), which interfaces between the telephone lines and the modem, is too large and heavy for the new "credit card" minimal size modem cards.

Just as data speeds are growing, modem size is decreasing. Modems are becoming an integral part of all LapTop/PalmTop computers. Because these computers are small, size and weight are at a premium. With the growing data rates, minimum distortion is a must. Distortion is one of the limiting factor for high speed modems.

Many modems available on the market today utilize an isolation transformer in the DAA section. While the transformer protects the electronic circuits, it also introduces distortion, consumes real estate and is the heaviest part of the modem section. In the case of portable computers, minimum weight is a priority requirement.

By eliminating the transformer and the distortion that comes with it, an increase in the data rate capabilities of the modem is realized. Size, weight and cost are also reduced significantly.

Although significant strides in improving performance and reducing the size of modems has been made, the DAA interface circuitry has remained relatively unchanged. In fact, on some of the lap top designs, the DAA occupies almost as much room as the remainder of the modem circuitry.

So far, designers have been able to stay within the packaging constraints by squeezing the parts closer together. However, designers are quickly reaching limits as they are now experiencing problems in meeting the UL and Part 68 high voltage breakdown test. In addition, the physical size of the DAA components prevents the installation of a modem in the new pocket computers.

One of the largest components in the DAA is the transformer. Functionally the transformer satisfies two design requirements.

First, it provides the necessary high voltage isolation between the telephone network and the user. In the United States, this is specified by FCC part 68 which requires 1500 volts. In other countries this isolation may be up to 3750 volts.

Second, it provides the balance interface circuit necessary to meet Part 68, as well as providing good common mode rejection of the noise signals normally on the telco lines.

To support both of these requirements and still maintain a very low distortion level results in a relatively large transformer. For example, the new high performance modems, like v32, require distortion levels of −70 dBm or lower. To achieve these levels require special magnetic material and large physical size.

Based on these problems, it is clear that there needs to be an alternate to the analog isolation transformer.

Experience indicates that when one attempts to add isolation circuitry in the analog circuit path, there will always be the problem of adding distortion.

SUMMARY OF THE INVENTION

The invention eliminates the large isolation transformer and provides isolation at the digital interface after conversion from an analog incoming signal and before the conversion to an outgoing analog signal. At this point it is possible to provide the isolation with much less concern for analog distortion. The novel isolation is preferably magnetic, In the form of two tiny pulse transformers. Other digital isolation methods, such as optical are also novel and applicable.

The Rockwell modem architecture provides an ideal structure to incorporate the isolation circuitry. This is between the Digital Signal Processor (DSP or CSPX) and the Integrated Analog (IA) device. Functionally, the signals at this interface are digital, and the data rates are moderate. Currently the interface between the CSPX and the IA consists of about 15 discrete lines, which include data, timing and control.

These parallel signals are combined into two serial data streams, one input, and one output. The data is encoded in a time division multiplex, self clocking scheme. All serial encoding and decoding is incorporated within the CSPX and IA devices.

For the above water/ground telephone systems, the modem must pass a metallic voltage surge test which is a pulse of 800 volts applied between the TIP and RING of the modem. While the modem is at the ON-HOOK state, there is no problem because the seizure relay is off (open), and thus, prevents the surge from getting into the electronic circuits. This 800 v surge is also applied while the modem is in the OFF-HOOK state, at which time the line switch is closed and the 800 v can cause an irreversible damage to our electronic circuits.

A synergistic result is obtained if the related ACTIVE SURGE REJECTION CIRCUIT is combined with a detector circuit which senses the appearance of the high level, fast rising surge in the DAA. This circuit disengages the electronics from the line before the surge can reach damaging magnitudes. The active rejection circuit serves as a surge protection unit—replaces the metal oxide varistor (MOV) and the isolation transformer, and provides line seizure switch replacement for the traditional relay. Component count is reduced by removing the transformer, MOV and the relay.

BRIEF DESCRIPTION OF THE DRAWINGS

FIG. 3 shows the surge detector and a line FET;
FIG. 4 shows a typical square wave;
FIG. 4A shows the wave differentiated to save power;
FIG. 5 shows coils for a pulse transformer;
FIG. 5A is a view in cross section of a pulse transformer:

DESCRIPTION OF THE PREFERRED EMBODIMENT

Figure 1:
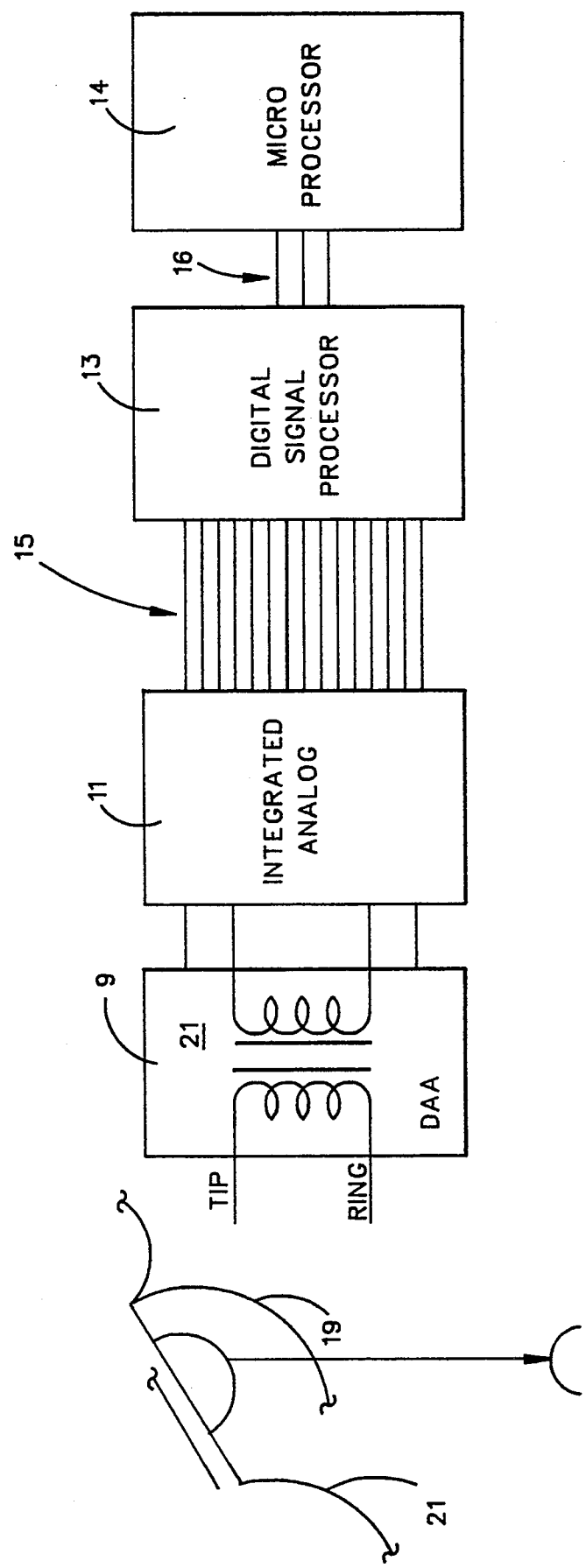
FIG. 1 is a block diagram of a prior art modem.

Currently, the Rockwell modem includes Data Access Arrangement (DAA)9, Integrated Analog (IA) device 11 (FIG. 1) and the Digital Signal Processor 13 (DSP). DAA 9 is connected to IA 11 by wires 10, and IA 11 and DSP 13 are connected by 15 individual wires 15, with the micro processor 14 being connected to DSP 13 by several wires 16. All Data Access Arrangement (DAA) devices 9 require a high voltage isolation between the telephone lines 19, 21 and a modem. Usually, transformer 21 (in the DAA section 9) provides this isolation.

Figure 2:
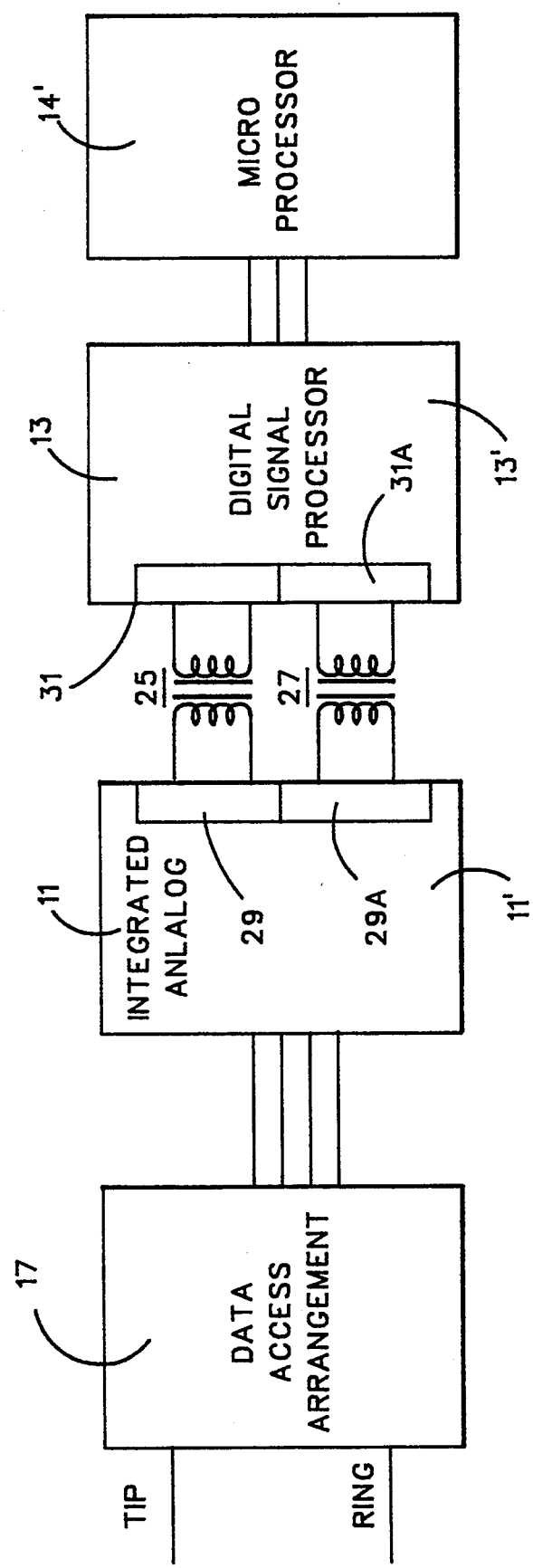
FIG. 2 is a block diagram of the present invention.
Figure 7:
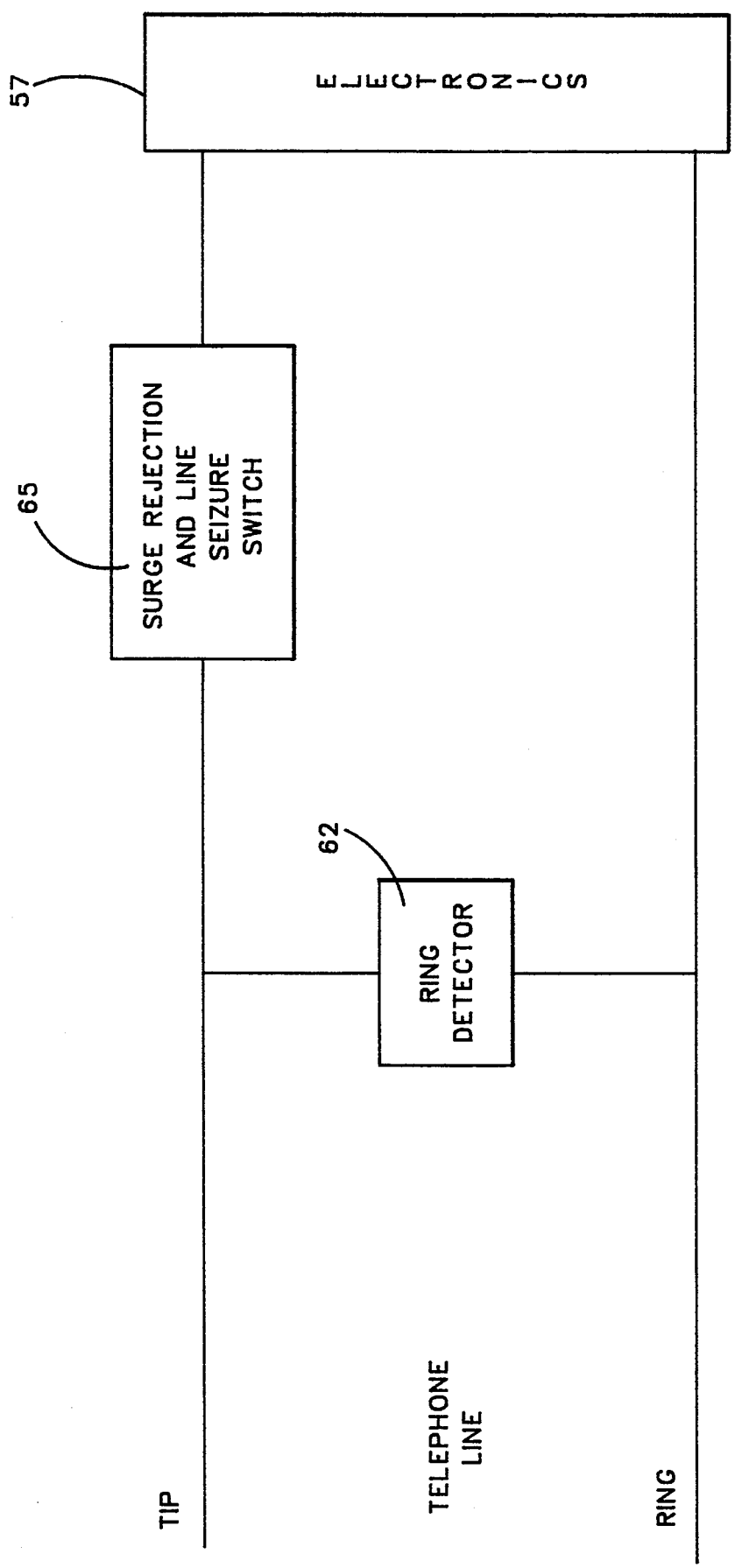
FIG. 7 shows a block diagram of the surge protection circuit being used in the absence of an isolation transformer; and, FIG. 8 is a circuit diagram of a transformer-less DAA circuit with surge protection.
Figure 8:
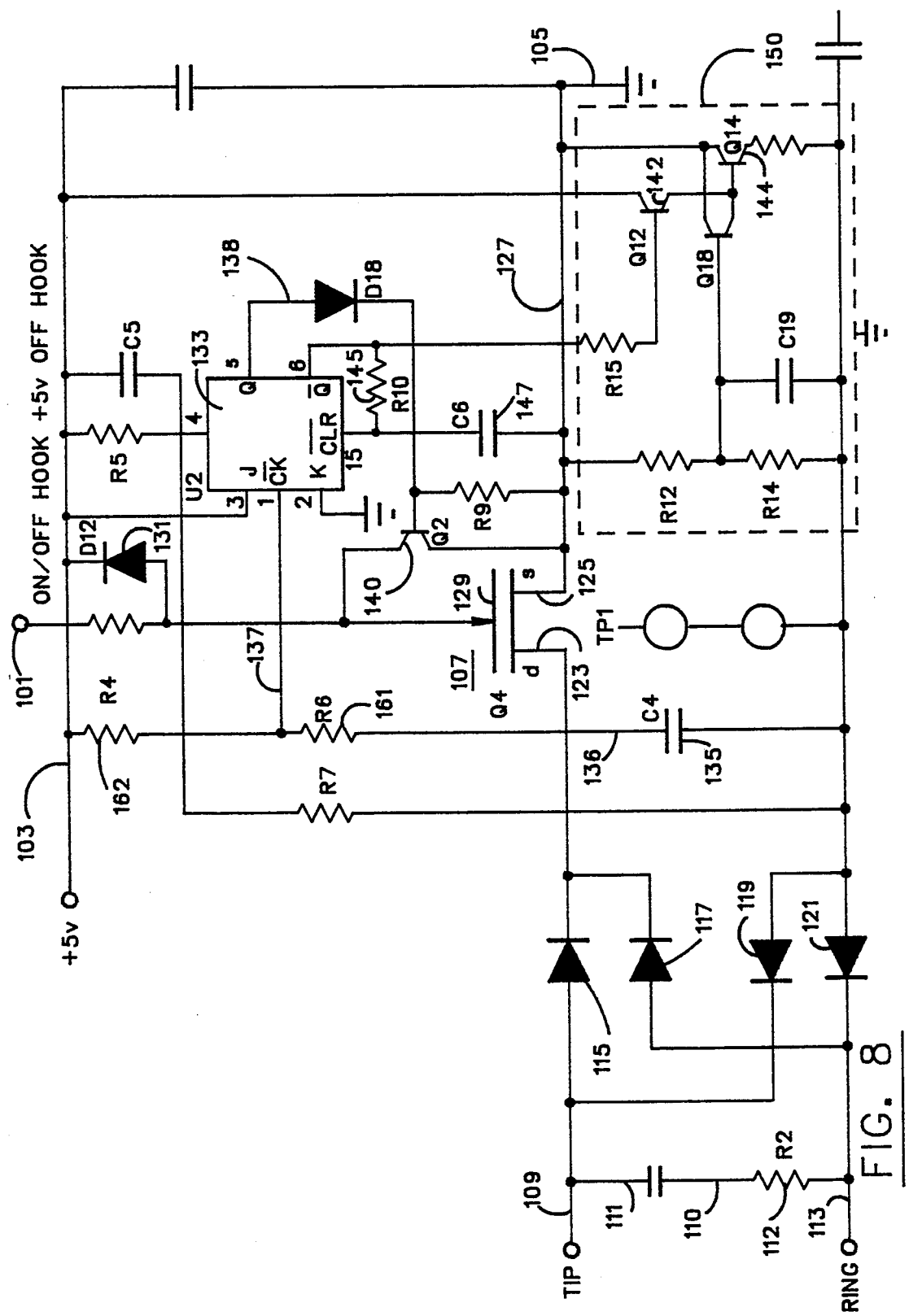

FIGS. 3, 7, and 8 detail the cross-referenced invention which uses a FET to open a lead from the telephone line system upon detecting a surge In the DAA section and provides a synergistic combination with the present invention, which is best seen In FIGS. 2, 5 and 5A.

In FIG. 2, the isolation transformer 21 has been eliminated and, instead, tiny pulsed transformers 25, 27 are used between the IA device 11' and the DSP 13'. The received integrated analog signal is digitized, and then multiplexed in box 29 and demultiplexed in box 31, whereas the transmitted signal is multiplexed in Box 31A and demultiplexed in box 29A, thus avoiding the 15 wire interconnection and all analog distortion.

Thus, It may be seen that the parallel signals on these leads (15) are combined into two serial data streams, one input and one output. The data is encoded in a time division multiplex, self clocking arrangement. All serial encoding and decoding is incorporated into the Integrated Analog and Digital Signal Processing devices 11' and 13', so that the isolation circuitry may consist only of two pulse transformers 25, 27 or two opto couplers (not shown).

Also, pulsed signals save power. It is only necessary to pass short spikes 35, 37 (FIG. 4A), representing up and down transitions of original wave 39, rather than to pass the full wave 39 (FIG. 4). Common mode rejection, as well as, high voltage isolation are attained by the pulse transformers.

FIGS. 5 and 7 show the construction of the pulse transformers 25 and 27 on conventional glass pc board 41 of, e.g. 062" thick. Center holes 36, 38 in the board, receive the legs 42, 43 and 44, 45 of U-bars 40, 46 to form the "gaps" where they abut. The coils 37, 39 surrounding the respective legs comprise only a few turns of metal, laid down on the board 41, and etched away to leave the coils, which may have diameters of about ⅛ inch. The U-bars are about ½ inch in length. The other pulse transformer 27 is spaced away from transformer 25 as far as practical, and the components are the same, bearing the primes of the same numbers. The best magnetic materials are employed for the magnetic path, such as ferrite, and the small dimensions easily fit space minimums.

The frequency of operation is in the megacycle range, and the power losses are extremely low because the pulse technique requires much less power than handling the entire wave. The pulse technique also handles common mode distortion problems.

In lieu of the preferred pulse transformers at the digital interface, other types of isolation may be used. Two opto couplers are also effective on two serial data streams, i.e. one input and one output, but the pulse transformer isolation uses less power.

For non-common mode, e.g. lightning caused surges, i.e., in above ground telephone systems, the block diagrams of FIGS. 3 and 7 show surge rejection circuits for use in DAA device 17 of FIG. 2. In FIG. 3, TIP line 51 includes FET 52 (or a fast acting transistor) to open this line. DETECTOR 53 between TIP lead 51 and RING lead 54, senses the surge and very quickly opens FET 52.

Figure 6:
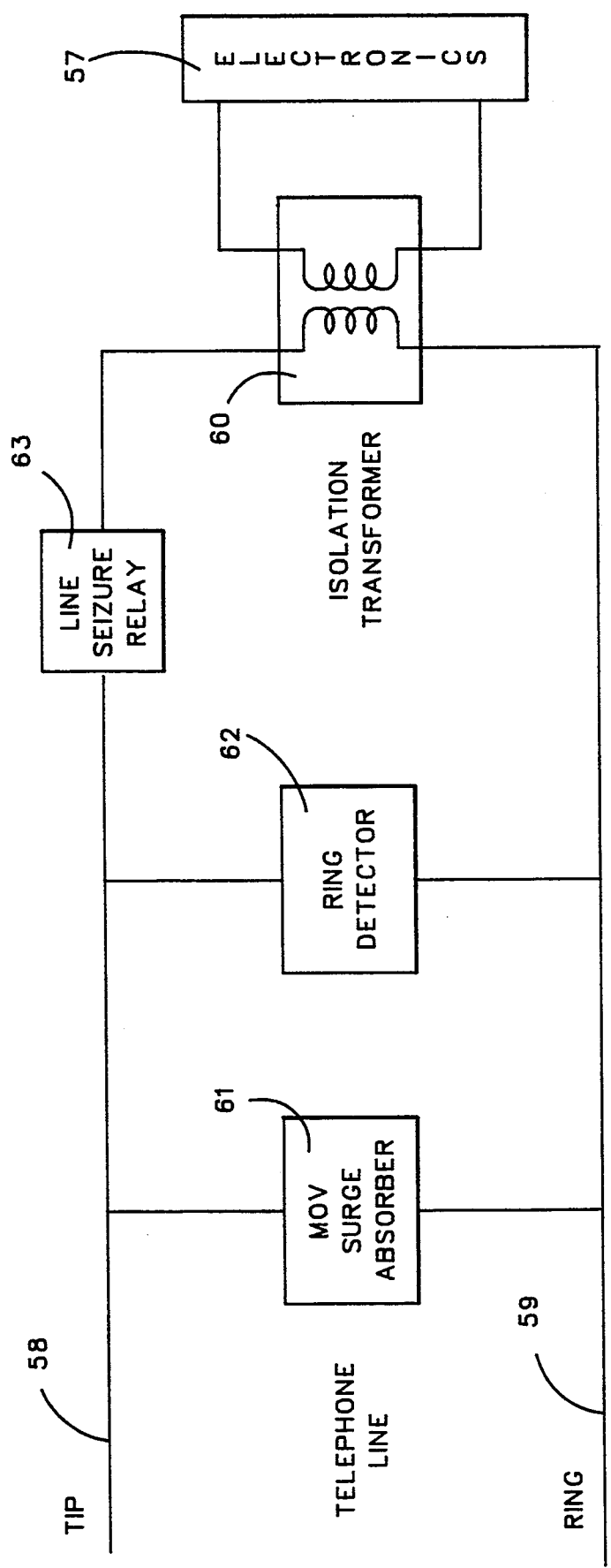
FIG. 6 shows a block diagram of a prior art surge protection circuit being used when the isolation transformer is present.

FIG. 6 shows PRIOR ART type surge protection for modems, e.g. 57 coupled to telephone lines 58, 59. The conventional isolation transformer 60 is shown connected between the telephone lines 58, 59 and the modem 57. MOV 61 (metal oxide varistor) is shown connected across the lines to act as a surge absorber. RING DETECTOR 62 is provided to indicate to modem 57 that a ring has appeared and the DSP 13, via IA11, operates LINE SEIZURE RELAY 63.

FIG. 7 shows a preferred surge protection circuit of this invention in the absence of isolation transformer 60. The details of this SURGE REJECTION and LINE SEIZURE SWITCH 65 are set forth In FIG. 8.

In FIG. 8, the ON and OFF Hook lead is shown at 101, supplying +5 volts in OFF HOOK, and the DC. power lead 103 receives +5 volts above ground 105 when the MODEM is on. FET 107 (BUZ 78) serves to open and close TIP lead in the signalling circuit for unexpected surges.

Capacitor 110 in parallel lead 111, including series resistor 112 across TIP lead 109 and RING lead 113, is a 0.33 μf, 250 volt capacitor and resistor 112 is 10,000 ohms. The pair comprise a dummy load for the RING signal.

Next, a full wave bridge rectifier comprises the four 1N4006 diodes 115, 117, 119 and 121 to insure positive voltage on the drain 123 of FET 107, source 125 being grounded at 105 over lead 127.

The circuit of FIG. 8 must provide protection under a variety of circumstances:

1) The modem's power is OFF at 103. At this time the FET 107 (Q4) is already in the OFF state. While in the OFF state, the FET will block high voltage from going through. When the fast rising surge arrives, it attempts to charge the FET gate 129 through the internal capacitance of the FET 107. Normally, this will cause the FET to turn ON. However, diode (1N1148) D12, shown at 131, keeps the FET 107 OFF by clamping the gate 129 to ground 105 via the 5 v power supply, thus, preventing any charge build-up on the gate 129.

2) The modem's power is ON at 103 and it's ON-Hook at 101. This case is similar to the previous one in the sense that the FET 107 is still OFF and no DC current is running through it. The FET is OFF because the ON-Hook signal coming through lead 101 keeps the gate 129 at ground level 105. At this time, the JK flip-flop 133 (U2) (74HC112) is powered from lead 103 and can assist in keeping the FET 107 OFF.

When the surge arrives it will pass through C4, shown at 135 (100pf) and becomes a clock to the JK flip-flop 133. Resistor R6, shown at 161, has 47,000 ohms and resistor R4, shown at 162 has 10,000 ohms. This 5:1 ratio determines the extent of the surge voltage necessary to clock OK flip-flop 133 over lead 137, and it can be made adjustable, if desired. As a result the Q output of the OK 133 will go up and turn Q2 140 (2H1222) ON over leads 138 and 127. Q2 140 will hold the gate 129 of Q4 140 clamped to ground level, which results in keeping the FET 107 at the OFF state.

3) The modem's power is ON at 103 and it's OFF-Hook at 101. This time around, the FET 107 is conducting line current because its gate receives 5 v from the lead 101. The surge will, again, go through C4 135 and clock the JK 133. The Q output of JK will go up and cause Q2 140 to turn ON. Q2 140 will turn the FET 107 OFF as soon as possible before the voltage builds up.

4) The modem's power is ON at 103 and it's OFF-Hook at 101 but no current flows through TIP and RING. This time the circuit performs the same way as in the last case. This situation is not likely to happen during normal use of the modem, but FCC labs do test the modem powered ON with no TIP and RING current.

In support of the above activities, Q12 142 (2N4403) turns ON any time the JK flip-flop 133 gets clocked and will turn Q14 144 (MJD 47) ON very fast. This action discharges the stray capacitance and the FET's 107 capacitance, preventing a voltage build-up.

R10 145 (47K) and C6 147 0.01 $\mu$f) hold the Q output of the JK flip-flop 133 at a high level which keeps the FET 107 OFF for about 1 mSec. This way the FET 107 is turned OFF for a period longer than the expected duration of the surge. In case the surge persists beyond (1 MS) the R7 & R5 C5 combination was designed to keep the OK at the clocked state which in turn keeps Q4 107 off.

It should be noted that, for AC purposes, ground 105 is connected to +5 volt lead 103, so a high potential spike or surge across TIP-RING causes the negative side of the pulse to pass via any of several paths in the electronic inductor box 150 up to ground 105 and to lead 103. Thus, the pulse is across the 5:1 voltage divider, R4 162, R6 161.

Also, when FET 107 is going from ON to OFF, there is still some energy passed through it, and voltage builds up across Q14, 144. After the clock, transistor Q12 142 turns on hard by Q bar, Q going up and Q14 144 is then turned on hard, absorbing the energy.

The surge protective circuit can work in any circuit or modem to protect, e.g., consumer products from non-common mode surges. Thus, the combination of the transformerless DAA with digital pulse transformers and the surge protection circuit precludes both uncommon mode and common mode problems. The digital isolation invention is applicable to most all modems.

What is claimed is:

1. A modem without a conventional isolation transformer, comprising in combination:
    a transformerless data access arrangement in communication with a telephone line system;
    an integrated analog device;
    a digital signal processor;
    a microprocessor;
    the integrated analog device connected to the data access arrangement and the microprocessor connected to the digital signal processor; and,
    pulse transformer means connected between the integrated analog device and the digital signal processor.

2. The modem of claim 1, wherein:
    each of said integrated analog device and said digital signal processor comprising multiplexers and demultiplexers to insure that only digital signals are applied to said pulse transformer means, thereby eliminating analog distortion.

3. The modem of claim 1 wherein:
    said pulse transformer means comprises a plurality of pulse transformers:
    said plurality of pulse transformers each comprise a printed circuit board portion having a pair of spaced apart holes and a few turns of etched metal encircling each hole, thereby forming a coil around such hole;
    a pair of U-shaped bars having legs on each end disposed across the spaced apart holes respectively on opposite sides of the printed circuit board with their legs respectively abutting in the holes to provide a magnetic gap path for the coil.

4. The method of eliminating a conventional transformer from a modem having a first section for receiving signals from, and transmitting signals to, a telephone line system, a second section for changing received signals from analog to digital and transmitted signals from digital to analog, a third section for processing digital signal and a fourth microprocessor section, comprising the steps of:
    (a) introducing pulse transformers between the second and third sections for digital received and transmitted signals in lieu of the conventional transformer in the first section;
    (b) multiplexing, in the second section, the received signals converted to digital form in the second section for application to at least one pulse transformer and demultiplexing said digital signals in the third section; and
    (c) multiplexing, in the third section, the third section digital signals for transmission and applying them to at least one different pulse transformer and demultiplexing the digital signals for transmission in the second section, thereby eliminating any necessity for the conventional transformer from the first section, whereby distortion produced by the conventional transformer is eliminated.

5. The method of minimizing analog distortion in a modem connected to a telephone line system which comprises the steps of:
    eliminating a conventional isolation transformer from a data access arrangement section;
    changing a signal isolation from analog signal isolation to digital signal isolation by using one of magnetic and optical isolation; and
    accomplishing said digital signal isolation between an integrated analog section and a digital signal processor section.

6. The method of claim 5, further comprising the step of:
    converting an incoming analog signal from the telephone line system to a first serial stream of digital data prior to the digital isolation, and converting an outgoing digital signal into a second serial stream of digital data prior to digital isolation.

7. The method of claim 6, further comprising the step of:

providing the digital isolation by using at least one pulse transformer for each stream of data.

8. The method of surge protecting and achieving isolation in a digital portion of a modem which obviates a conventional isolation transformer, comprising the steps of:
   establishing a path for analog signals from a telephone line system to a digital interface;
   changing the analog signals to digital signals at the digital interface and passing the digital signals to a modem microprocessor;
   establishing a digital signal path from the microprocessor to the digital interface;
   passing the digital signals from the microprocessor through the digital interface;
   changing the digital signals from the digital interface to analog signals and passing the analog signals to the telephone line system:
   disposing a FET in one incoming telephone line for opening and closing said incoming telephone line;
   sensing a surge voltage;
   preventing said FET from conducting current when said surge voltage is sensed; and,
   maintained the preventing until the surge voltage has passed.

9. The method of surge protecting and minimizing analog distortion in a modem connected to a telephone line system which comprises the steps of:
   eliminating a conventional isolation transformer from a data access arrangement, and:
   changing signal isolation from analog signal isolation to digital signal isolation;
   disposing a FET in a incoming telephone line for opening and closing said incoming telephone line;
   sensing a surge voltage;
   preventing said FET from conducting current when said surge voltage is sensed; and,
   maintaining the preventing until the surge voltage has passed.

10. The method of claim 9, wherein said digital signal isolation is accomplished by using one of magnetic and optical isolation.

11. The method of claim 10, further comprising the step of:
    accomplishing said digital signal isolation between an integrated analog section and a digital signal processor section.

12. The method of claim 11, further comprising the step of:
    converting a telephone line incoming analog signal to a first serial stream of digital data prior to the digital signal isolation, and converting an outgoing digital signal into a second serial stream of digital data prior to the digital signal isolation.

13. The method of claim 12, further comprising the step of:
    providing said digital signal isolation by using at least one pulse transformer for each stream of data.

14. A modem without a conventional isolation transformer, comprising in combination:
    a transformerless data access arrangement in communication with a telephone line system;
    an integrated analog device;
    a digital signal processor;
    a microprocessor;
    the integrated analog device connected to the data access arrangement and the microprocessor connected to the digital signal processor;
    pulse transformer means connected between the integrated analog device and the digital signal processor;
    TIP and RING leads for communicating between the telephone line system and the modem;
    a FET connected to open and close one of said TIP and RING leads;
    an ON/OFF HOOK circuit for supplying operating voltage to said FET when in an OFF HOOK mode;
    a first circuit and a second circuit;
    a flip-flop circuit for activating said first circuit in one condition and said second circuit in a second condition;
    sensing means connected across said leads for activating said flip-flop circuit to said one condition upon sensing a surge voltage;
    said first circuit preventing said FET from conducting current when said first circuit is activated; and,
    said second circuit resetting the flip-flop circuit after a predetermined time.

15. The modem of claim 14, further comprising:
    multiplexer means in the integrated analog device for a received signal and demultiplexer means in the digital signal processor for the received signal;
    further multiplexer means in the digital signal processor for a transmitted signal and further demultiplexer means in the integrated analog device for the transmitted signal, all of said transmitted signals and received signals passing through said pulse transformer means and being digital whereby analog signal distortion is avoided.

16. The modem of claim 15, further comprising:
    clamp means for clamping a gate of said FET to ground in response to a surge voltage to prevent charge build-up on the gate.

17. The modem of claim 16, further comprising:
    a first transistor connected to said flip-flop circuit to saturate when the flip-flop circuit is clocked;
    a second transistor connected to the first transistor to turn on rapidly by the second transistor conducting; and,
    a shorting pathway closed by said first and second transistors from the RING lead to ground to discharge stray capacitance including any FET capacitance.

18. The modem of claim 17, further comprising:
    a rectifier bridge circuit connected between the TIP and RING leads to insure positive voltage to a drain of the FET.

19. The modem of claim 18, further comprising:
    a resistor-capacitor series circuit connected across the TIP and RING leads to serve as a dummy load for a RING signal.

20. The modem of claim 19 further comprising:
    an electronic inductor for said modem including said first and second transistors and a parallel resistor-capacitor circuit.

21. The modem of claim 14, wherein:
    said sensing means comprises a series circuit comprising of a capacitor and two resistors with a common point to both resistors being connected to a clock input of said flip-flop circuit, relative values of said resistors determining a point in the surge voltage which activates the flip-flop circuit.

22. The modem of claim 14 wherein:
    said first circuit comprises a clamping transistor having its base connected to a Q output of the flip-flop circuit and being connected across a source-gate of said FET to ground a gate of the FET when the flip-flop circuit is clocked.

23. The modem of claim 14, wherein:
said second circuit comprises a resistor-capacitor network connected to a Q bar output of the flip-flop circuit the capacitor, and connected to a CLEAR input of the flip-flop circuit for discharging when the flip-flop circuit is clocked to maintain a gate grounding of the FET until after the surge voltage has disappeared.

* * * * *